United States Patent
Goldberg et al.

(10) Patent No.: US 6,598,046 B1
(45) Date of Patent: Jul. 22, 2003

(54) SYSTEM AND METHOD FOR RETRIEVING DOCUMENTS RESPONSIVE TO A GIVEN USER'S ROLE AND SCENARIO

(75) Inventors: Motti Goldberg, Denver, CO (US); Jeffrey D. Kenyon, Boulder, CO (US); Edwin K. Winkel, Englewood, CO (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 09/162,596

(22) Filed: Sep. 29, 1998

(51) Int. Cl.[7] ............................................. G06F 17/30
(52) U.S. Cl. ............... 707/5; 707/2; 707/6; 707/104.1; 704/243; 706/45
(58) Field of Search ............................. 707/1–7, 9–10, 707/100–104.1, 500–501, 513–514; 709/200–203; 706/45–50, 61; 704/1–4, 9–10, 243–245, 257

(56) References Cited

U.S. PATENT DOCUMENTS

| | | | |
|---|---|---|---|
| 5,428,778 A | | 6/1995 | Brookes |
| 5,454,105 A | | 9/1995 | Hatakeyama et al. |
| 5,535,382 A | | 7/1996 | Ogawa |
| 5,555,408 A | | 9/1996 | Fujisawa et al. |
| 5,576,954 A | * | 11/1996 | Driscoll ......................... 707/3 |
| 5,625,767 A | | 4/1997 | Bartell et al. |
| 5,634,051 A | | 5/1997 | Thomson |
| 5,642,502 A | * | 6/1997 | Driscoll ......................... 707/5 |
| 5,715,445 A | | 2/1998 | Wolfe |
| 5,752,020 A | | 5/1998 | Ando |
| 5,757,983 A | | 5/1998 | Kawaguchi et al. |
| 5,761,666 A | | 6/1998 | Sakai et al. |
| 5,768,142 A | | 6/1998 | Jacobs |
| 5,778,397 A | * | 7/1998 | Kupiec et al. ............... 707/500 |
| 5,893,095 A | * | 4/1999 | Jain et al. ....................... 707/6 |
| 5,915,250 A | * | 6/1999 | Jain et al. .................... 707/100 |
| 5,987,457 A | * | 11/1999 | Ballard ........................... 707/5 |
| 6,101,503 A | * | 8/2000 | Cooper et al. ............... 707/104 |

FOREIGN PATENT DOCUMENTS

| | | | | |
|---|---|---|---|---|
| WO | WO96/23265 | * | 3/1998 | ........... G06F/17/30 |
| WO | WO98/09229 | * | 3/1998 | ........... G06F/17/30 |

OTHER PUBLICATIONS

Gardner, D., "Get Smart", Enterprise Computing, Info World, Apr. 6, 1998. One page only.
Baldonado, M.Q.W. et al. "Sensemaker: An Information–Exploration Interface Supporting the Contextual Evolution of a User's Interests." Proceedings, Computer–Human Interaction 1997, 4 Pages Only (both sides.
Belkin, N.J. et al., "Cases, Scripts, and Information–Seeking Strategies: On the Design of Interactive Information Retrieval Systems." Expert Systems With Applications, vol. 9. Nov. 1994, pp. 1–30.
"Monsanto Moves Toward Practical KM Solution", From KMWorld, V.7 i.6, May 11, 1998, p. 3 only.
"Indexing Tool Handles Multiple Document Types," by Hibbard,J. Informationweek, Mar. 23, 1998. One page only.
"Net Document Management is in the Cards for Plumtree," PCWeek, by J. Rapoza, Apr. 20, 1998. One page only.
"Building Card Catalogs for Corporate Intranets," by K. Murphy, Intranet World, May 11, 1998. one page only.

* cited by examiner

*Primary Examiner*—Srirama Channavajjala
(74) *Attorney, Agent, or Firm*—Brooks & Kushman (57) ABSTRACT

A document retrieval and navigational system and method based on a user's role, scenario, and context in a given context or scenario. A database is provided which has a plurality of documents which are stored therein. Each document having metadata defined by at least one predetermined tag and corresponding value which is assigned thereto. Selection criteria is received and corresponds to a user scenario. The received selection criteria is compared to the metadata of each document to determine if there is a document match. In the case that a document match is found, a retrieval report is generated for presentation on the output device which includes each document match.

22 Claims, 8 Drawing Sheets

```
┌─────────────────────────────────────────────────────────┐
│ PROVIDING A DATABASE IN COMMUNICATION WITH A SEARCHING  │──100
│ PROCESSOR, THE DATABASE INCLUDING A PLURALITY OF DOCUMENTS│
│ OF HOMOGENOUS SUBJECT MATTER EACH WITH PREDETERMINED TAGS│
│ AND CORRESPONDING VALUES.                               │
└─────────────────────────────────────────────────────────┘
                            ↓
┌─────────────────────────────────────────────────────────┐
│ RECEIVING AT THE SEARCHING PROCESSOR A SEARCH REQUEST   │──102
│ SIGNAL INCLUDING A SEARCH REQUEST GENERATED BY THE USER │
│ HAVING AT LEAST ONE USER TAG AND CORRESPONDING USER VALUE│
└─────────────────────────────────────────────────────────┘
                            ↓
┌─────────────────────────────────────────────────────────┐
│ PARSING THE SEARCH REQUEST TO EXTRACT THE AT LEAST ONE USER│──104
│ TAG THEREIN.                                            │
└─────────────────────────────────────────────────────────┘
                            ↓
┌─────────────────────────────────────────────────────────┐
│ COMPARING THE EXTRACTED USER TAGS TO THE PREDETERMINED  │──106
│ TAGS IN THE AT LEAST ONE DATABASE                       │
└─────────────────────────────────────────────────────────┘
                            ↓
┌─────────────────────────────────────────────────────────┐
│ GENERATING A RESPONSE SIGNAL FOR RECEIPT BY THE USER, THE│──108
│ RESPONSE SIGNAL HAVING ONE OR MORE DOCUMENTS RESPONSIVE TO│
│ THE USER SCENARIO AND SEARCH REQUEST.                   │
└─────────────────────────────────────────────────────────┘
```

*Fig. 5*

| TAGS | NUMERICAL VALUE | POSSIBLE VALUES | ACTUAL USER VALUES CORRESPONDING TO TAGS (TAGS=VALUE) |
|---|---|---|---|
| TAXPAYER CLASS | 4 | PERSONAL, CORPORATE, NON-PROFIT ORG., CHURCH | PERSONAL |
| MARITAL STATUS | 3 | SINGLE, MARRIED, WIDOWED | SINGLE |
| FILING STATUS | 2 | INDIVIDUAL, JOINT CORPORATION, PARTNERSHIP | INDIVIDUAL |
| INCOME | 1 | <$2,000<br>$2,000 - $50,000<br>$50,001 - $150,000<br>$150,001 - $600,000<br>$600,001 - $1,000,000<br>> $1,000,000 | $25,000 |
| GOAL/ KEYWORDS | 1/MATCHED KEYWORD | INCOME TAX RETURN PREPARATION AND FILING<br><br>PERSONAL TAX PLANNING<br><br>ESTIMATED TAX WITHOLDING<br><br>HEAD OF HOUSEHOLD REQUIREMENTS<br>ETC. (OPEN FIELD) | PREPARING INCOME TAX RETURN FORM |

| DOCUMENT (116) | TITLE (122) | TAGS (118) | VALUES (120) | NUMERICAL VALUE POINTS (132) |
|---|---|---|---|---|
| 1 | EASY INCOME TAX FORM, SINGLE, NO DEPENDANTS | TAXPAYER CLASS | PERSONAL | 4 |
| | | MARITAL STATUS | SINGLE | 3 |
| | | FILING STATUS | INDIVIDUAL | 2 |
| | | INCOME | <$2,000, $2,001 - $50,000 | 1 |
| | | GOAL/KEYWORDS | EASY, FORM "INCOME TAX" SINGLE NO DEPENDENT PREPARING RETURN | 4 |
| 2 | INSTRUCTIONS FOR COMPLETING JOINT RETURN | TAXPAYER CLASS | PERSONAL | 4 |
| | | MARITAL STATUS | MARRIED | 0 |
| | | FILING STATUS | JOINT | 0 |
| | | INCOME | ANY | 1 |
| | | GOAL/KEYWORDS | JOINT INSTRUCTIONS "INCOME TAX" RETURN | 2 |
| 3 | CHARITABLE DONATIONS BY CORPORATIONS | TAXPAYER CLASS | BUSINESS | 0 |
| | | MARITAL STATUS | N/A | 0 |
| | | FILING STATUS | CORPORATION | 0 |
| | | INCOME | ANY | 1 |
| | | GOAL/KEYWORDS | CHARITY, DONATIONS | 0 |
| 4 | REQUIREMENTS FOR NON-PROFIT STATUS RECOGNITION | TAXPAYER CLASS | NON-PROFIT | 0 |
| | | MARITAL STATUS | N/A | 0 |
| | | FILING STATUS | N/A | 0 |
| | | INCOME | ANY | 1 |
| | | GOAL/KEYWORDS | REQUIREMENTS NON-PROFIT STATUS RECOGNITION | 0 |

| 5 | TAX IMPLICATIONS AND REQUIREMENTS FOR CHURCHES | TAXPAYER CLASS | CHURCH | 0 |
| --- | --- | --- | --- | --- |
| | | MARITAL STATUS | N/A | 0 |
| | | FILING STATUS | N/A | 0 |
| | | INCOME | ANY | 1 |
| | | GOALS/KEYWORDS | TAX IMPLICATIONS, REQUIREMENTS, CHURCH, RELIGIOUS ORGANIZATIONS | 0 |
| 6 | HEAD OF HOUSEHOLD REQUIREMENTS | TAXPAYER CLASS | PERSONAL | 4 |
| | | MARITAL STATUS | SINGLE MARRIED WIDOWED | 3 |
| | | FILING STATUS | INDIVIDUAL JOINT | 2 |
| | | INCOME | ANY | 1 |
| | | GOAL/KEYWORDS | HEAD OF HOUSEHOLD REQUIREMENTS | 0 |
| 7 | INSTRUCTIONS FOR PREPARING EASY INCOME TAX FORM, SINGLE, NO DEPENDANTS | TAXPAYER CLASS | PERSONAL | 4 |
| | | MARITAL STATUS | SINGLE | 3 |
| | | FILING STATUS | INDIVIDUAL | 2 |
| | | INCOME | <$2,000 $2,000 - $50,000 | 1 |
| | | GOAL/KEYWORDS | EASY, FORM "INCOME TAX" SINGLE, NO DEPENDENT PREPARING, COMPLETING INSTRUCTIONS RETURN | 4 |

Fig. 6b-b

SYSTEM AND METHOD FOR RETRIEVING DOCUMENTS RESPONSIVE TO A GIVEN USER'S ROLE AND SCENARIO

TECHNICAL FIELD

This invention relates to a system and method for navigating through a document space and for retrieving documents.

BACKGROUND ART

It is common today for an organization—be it public, private, academic or otherwise—to maintain a catalog of documents which is continually augmented. However, such organizations often may not realize the full potential and extent of the knowledge and information contained in their respective document catalogs because of a disparity between the way the documents are organized, the procedure by and stage at which information is sought by the user, and the manner and nature of the user's intended application of the information. In other words, most document catalogs are not efficient in getting the appropriate information to the appropriate user at the appropriate or desired time. This is particularly true in the case of a user of a document catalog who has a specific role in a specific context and time frame, and who desires to get the appropriate information she needs at that junction. This is even more particularly true in cases when the user does not know exactly what information is needed, yet the information must be delivered in a consistent and efficient manner.

Users in a business environment typically approach an information or document repository with a specific business goal in mind. This business goal, together with any prior experience in performing the task, forms the user's mental model. Like any other model, a mental model provides a predictive or explanatory value, and determines the information-seeking strategy one uses to obtain sought-after information. Since mental models are formed on the basis of familiarity with a particular domain, a novice may have a mental model that is considerably different (and probably less efficient) than the mental model of an expert.

Although there are a number of distinct information-seeking strategies, ranging from finding and retrieving a known document to free-form information exploration, current navigational models are limited, and do not take strategies or user models into account. Groups of users—even groups working toward a similar goal or on a similar project—may have different needs and goals based on different subgoals assigned or different stages in the process; hence, they may have a different information-seeking strategy. Further, an individual user may have different information-seeking strategies under different circumstances and at different stages of a project or process. Moreover the information retrieved may be outdated or obsolete, and therefore is of little value to the user.

Common navigational models known in the art are those such as cross-references or embedded links, table of contents, and indexing. Cross-referencing includes finding relevant documents and pursuing a subset of references in that document that are interesting to a user given the user's scenario and knowledge. Table of contents includes text in a document which is arranged according to the author's mental model and which provides navigational tools for finding desired information—i.e. page numbers, links to text, etc. Indexing includes forming an index based on keywords or concepts. However, in indexing, if the user does not use the same terminology as the author to describe a concept, the search may be only partially successful or may fail completely. Also, indexing does not incorporate a mental model, beyond the author's use of specific words, of how the document is to be used or applied.

Another searching methodology, known in the art as publish/subscribe methodology is generally a broad search for keywords which may exist in a document. This method is often hit-or-miss and often relies on the user predicting what terms an author may have included in his/her document. This methodology also depends on a user knowing what she wants or needs, and knowing how to access to it. Novice users, because of their incomplete mental model in the subject matter domain, may not have such breadth of knowledge. This method further may return information or documents not relevant to the user at all or not relevant to the user at a particular time. Thus while a user may be interested in many areas, that interest is generally a function of the current task. In other words, a user may need or be interested in particular information at a later stage of a process, but not while she is currently involved at an earlier stage.

Likewise, these methods do not allow an organization, through its documents, to enforce or establish policy parameters for its employees.

For the vast majority of documents and document catalogs, including corporate and university intranets and other document repositories, the foregoing describes the most common range of navigational options available and their limitations.

Consequently, a need has developed for a system and method which provides for a document navigational and retrieval model that aligns more closely with the needs and strategies of the individual user, and incorporates a user's scenario. The system and method should consider the process or stage of development of the user. The system and method should also still reflect an organization's demands for timely and efficient cataloging of documents and use of retrieval sources. The invention should also allow for providing users with the most up-to-date information. The system and method should also allow an organization to enforce its organizational policies and protocols through the documents it provides.

SUMMARY OF THE INVENTION

It is an object according to the present invention to provide a system and method for overcoming current limitations to accessing information and retrieving documents.

It is another object according to the present invention to provide a system and method for allowing a user to navigate documents and retrieve documents based on the user's scenario, including user role, context and stage of a particular process.

It is another object according to the present invention to reduce the cost to maintain a presentation interface.

It is still another object according to the present invention to manage dynamically a document database.

It is yet another object according to the present invention to reduce the need to statically link a document in a database.

It is still further an object according to the present invention to provide a system and method for document retrieval which defines a scenario in terms of tags and values and retrieves a document with a given range of corresponding metadata.

It is still further an object according to the present invention to provide a method and system for ranking documents in terms of relevancy once retrieved.

In carrying out the above objects, features and advantages of the present invention, provided is a method of retrieving documents responsive to a given user-specified scenario and serving at least one user accessing an output device. In this method, a database is provided which has a plurality of documents which are stored therein. Each document has metadata defined by at least one predetermined tag and corresponding value which is assigned thereto. This method also includes a selection criteria which is received and corresponds to the user-specified scenario. Further included is comparing the received selection criteria to the metadata of each document to determine if there is a document match of tags and values. In the case that a document match is found, the method includes generating a retrieval report for presentation on the output device which includes each document match.

In order for an information search to be successful to a user having any level of experience and knowledge, she ideally must be able to conform to a single mental model of the author, who is probably an expert in that area. Since it is unlikely that a novice can spontaneously generate an appropriate expert mental model, and since it is equally unlikely that an expert can anticipate all possible user mental models, a logical approach would be to accommodate as many mental models (including novice and expert) as possible. By increasing the number of ways through which the document space can be navigated, the opportunity that the user's mental model and the navigation model will converge improves. This allows an organization to enforce company policy by only allowing access to certain documents once the proper processes have been followed.

In one embodiment, the user scenario is received through user prompting to enter the selection criteria. In another embodiment, the method includes receiving the selection criteria by receiving a user tag and corresponding user value assigned thereto based on the actual user scenario. In still another embodiment, a searchable phrase is received which corresponds to the actual user scenario. The searchable phrase is parsed and keywords are extracted which corresponding to at least one user tag and corresponding user value. And yet in another embodiment, the method includes receiving a searchable phrase which corresponds to the actual user scenario. The searchable phrase is translated into a set of user tags and corresponding user values. In still another embodiment, the method includes receiving at least one user tag and corresponding user value associated with a process, a stage of the process, or a step in a development, in which the user is operating. The selection criteria may be received by the user via a keyboard, mouse or other means of input known in the art. Such criteria may be directly input in the form of tags and values so that the criteria does not need to be parsed or translated.

The method may also involve a database for storing other information related to the user. For example, in another embodiment, the method further includes storing the user selection criteria in a storage database. The storage database may be searched for stored user selection criteria from prior searches. The method may also include parsing the search request to extract at least one user tag and a corresponding user value that may be present in the search request.

The method may also infer at which stage of a scenario the user is at based on the tags and values submitted and allows a user to "move through" a scenario from beginning to end or at various intervals.

In further carrying out the aforementioned objects, features and advantages of the present invention, a document retrieval system according to the present invention is provided for access by at least one user. The system includes a database including a plurality of documents each having assigned thereto a set of predetermined tags and at least one corresponding predetermined value for each tag which define the parameters by which each document is searchable in the database. Also included in the system is a processor in communication with the database for receiving a plurality of user tags and corresponding user values. The user scenario (tags and values) are preferably received from the user accessing an input device like a keyboard. The processor also compares the user tags and corresponding user values with the predetermined tags and corresponding predetermined values to determine a match. The processor also generates a results output of documents which corresponds to the matched documents and sends them to an output device for presentation to the user.

The above objects and other objects, features and advantages of the present invention are readily apparent from the following detailed description of the best modes for carrying out the invention when taken in connection with the accompanying drawings wherein like reference numerals correspond to like components.

BRIEF DESCRIPTION OF THE DRAWINGS

FIG. 6b (a–b) is a diagram of the contents of a document repository according to the example of FIG. 6a;

FIG. 6c is a diagram of a processor's document ranking calculations, according to another embodiment of the example of FIG. 6a.

BEST MODE FOR CARRYING OUT THE INVENTION

Figure 1:
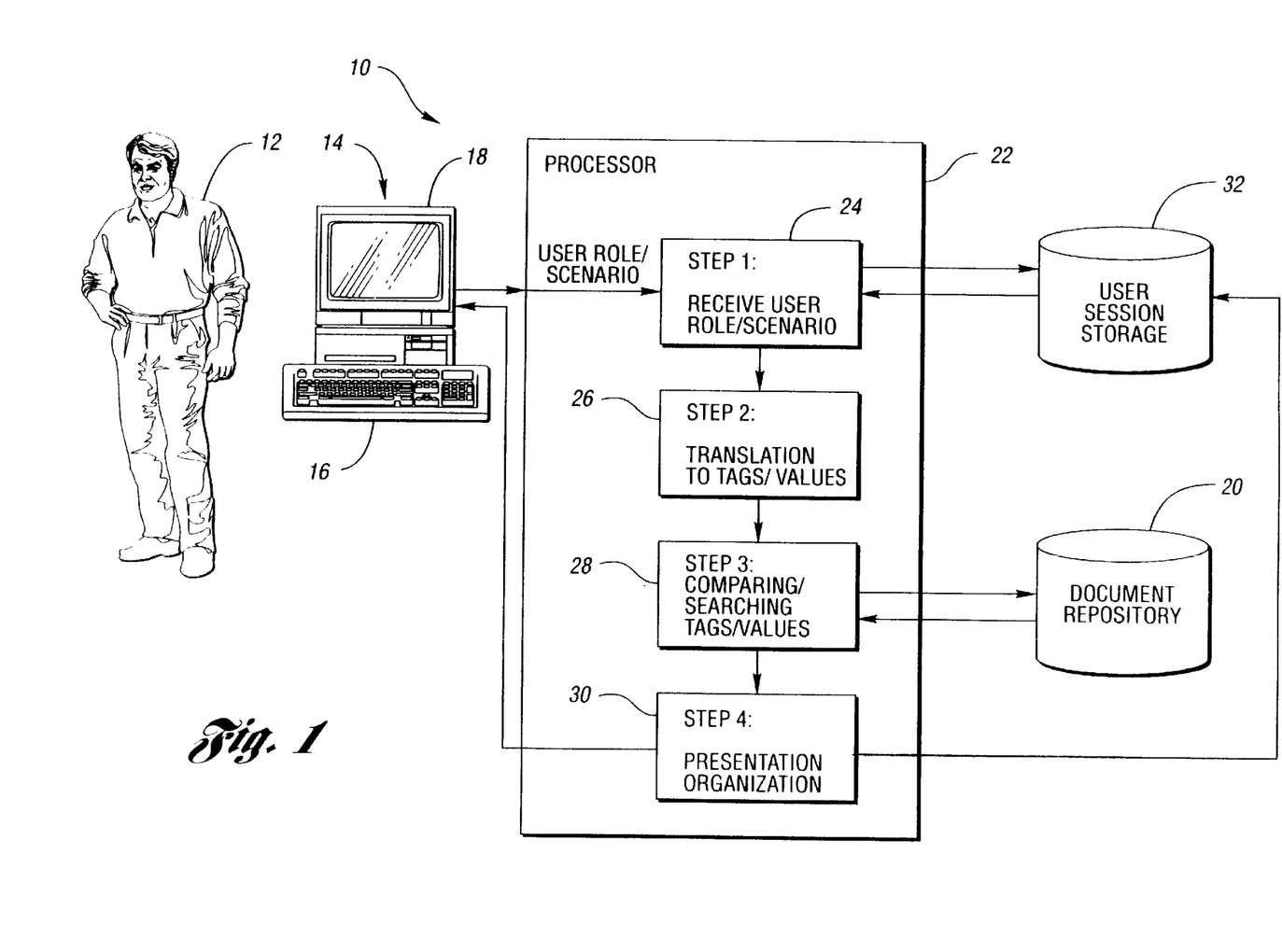
FIG. 1 is a schematic system diagram of the document retrieval and navigational system according to the present invention.

With reference to FIG. 1 of the drawings, there is provided a system diagram according to the present invention of a user scenario-based navigational and document retrieval system 10. System 10 is adaptable for access by at least one user 12 having access to at least one computer 14 which has a keyboard 16 for entering the search criteria as taught by the present invention and a display monitor 18. System 10 also includes a database or document repository 20 having a plurality of documents stored therein (best shown in FIGS. 2 and 6). As discussed further herein, each document has assigned to it a set of predetermined tags and preferably at least one corresponding predetermined value for each tag (defined as metadata 23). These tags and values define the parameters by which each document is searchable in repository 20.

System 10 also includes a searching processor 22 which is provided in communication with user's computer 14 having keyboard 16 and monitor 18. As discussed more fully herein, processor 22 performs a number of functions to achieve the goals and objectives herein. Generally, processor 22 receives from user 12, who is entering information via keyboard 16, selection criteria which includes one or a plurality of user tags and corresponding user values. As discussed herein, the user tags and values may either be entered in that form, or may be entered by other phrasing methods or character strings which are later parsed or translated into tags and values. Processor 22 compares the user tags and corresponding user values with the predetermined tags and corresponding predetermined values which are assigned to each document in repository 20 to determine if there is a match. An output device such as display 18 (or printer 19 of FIG. 6d) is in communication with processor 22 for delivering the results output to user 12.

The scenario-based navigational/document-retrieval model according to the present invention is defined by a user's given scenario in the parameters in which user 12 is operating. The scenario in which user 12 operates may include, among other factors, the specific organization in which the user functions, the user's role and the user operating at a certain stage of a process or project. The scenario also includes a user's goal, which is either an ultimate goal or a sub-goal, and to which the user seeks information relevant to achieve that goal. To this end, repository 20 has a set of information through which user 12 must navigate in order to retrieve the information desired. This set of information is provided in database or repository 20 which is available to and accessible by user 12 via processor 22. To meet these requirements, repository 20 is dynamically created, augmented and maintained.

More particularly, user 12 typically has access to computer 14 having a central processing unit (CPU). Computer 14 accesses a system 10 based processor 22 which is provided in communication with computer 14 for searching and navigating through repository 20 according to the present invention. As illustrated in FIG. 1, processor 22 performs various functions in accordance with the teachings herein. These functions are shown in FIG. 1 and include: (1) receipt of selection of criteria specification, designated as 24; (2) criteria parsing/translation, designated as 26; (3) searching/comparing, designated as 28; and (4) organization and presentation of results, designated as 30. System 10 further includes a second database 32 which stores data and information from each user session to form a "memory" of the user's scenario history. Such database 32 assists in making searches more efficient as system 10 will know which documents were previously accessed by a user at various stages or tasks.

It is contemplated that database 32 is also operative to "enable work flow." In other words, as the user moves from one process step to the next in a scenario, processor 22 generates a signal to repository 20 to update the set of relevant documents available to the user for that next step, while signaling database 32 to update the relevant user information.

The first function 24 performed by processor 22, is receipt of selection of criteria specification, which includes scenario, process, role and context. The user's role is who the user is and the function that the user performs. The role may determine which scenarios are available, or may affect process steps. Again, the scenario is a process used to achieve a goal. It is a combination of the underlying process and the -user's position and function within that process. The process includes steps and criteria which preferably signal or define when the next step should be taken, as previously described. Of course, it is contemplated that the scenario may often include the role. The context parameter may alter the process steps, for example, context may include a user's level of expertise (for example novice, intermediate, expert) or the nature and extent of the user's interaction with the repository (for example whether the results teach the user or are interactive with the user). Such role, scenario, context and search terms act as a filter between what is available in repository 20 and what is relevant (and consequently retrieved by user 12). The user scenario and search terms are also intended to help the novice user figure out what is and is not relevant to a particular task within a scenario. While a catalog of pre-defined scenarios within a repository 20 should become relatively stable within a time period following the introduction of a systems application, system 10 will continue to support the creation of "user-specific" scenarios, built out of scenario sub-goals, and direct specification of metadata.

The first function 24 performed by processor 22, is receipt of selection of criteria specification, which includes scenario, process, role and context. The user's role is who the user is and the function that the user performs. The role may determine which scenarios are available, or may affect process steps. Again, the scenario is a process used to achieve a goal. It is a combination of the underlying process and the user's position and function within that process. The process includes steps and criteria which preferably signal or define when the next step should be taken, as previously described. Of course, it is contemplated that the scenario may often include the role. The context parameter may alter the process steps, for example, context may include a user's level of expertise (for example novice, intermediate, expert) or the and nature and extent of the user's interaction with the repository (for example whether the results teach the user or are interactive with the user). Such role, scenario, context and search terms act as a filter between what is available in repository 20 and what is relevant (and consequently retrieved by user 12). The user scenario and search terms are also intended to help the novice user figure out what is and is not relevant to a particular task within a scenario. While a catalog of pre-defined scenarios within a repository 20 should become relatively stable within a time period following the introduction of a systems application, system 10 will continue to support the creation of "user-specific" scenarios, built out of scenario sub-goals, and direct specification of metadata.

Figure 2:
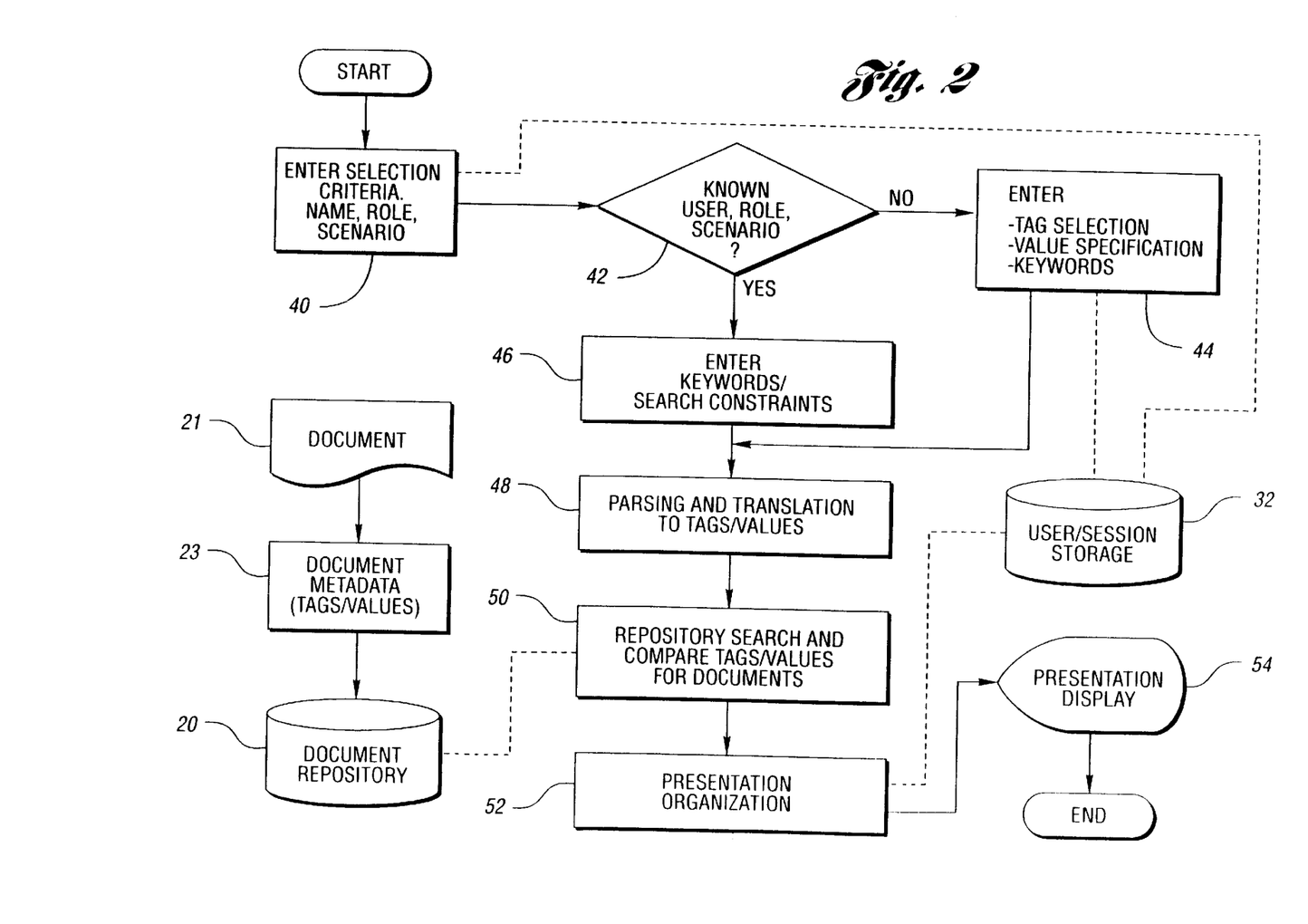
FIG. 2 is a flow diagram of an embodiment of the implementation of the system and method according to the present invention.

Each document in repository 20 is catalogued by metadata (best shown in block 23 of FIG. 2). Metadata includes tags (sometimes called categories, attributes, or fields) and their corresponding values. Metadata provides added information about a document, apart from the document content. In one embodiment, the tags may include those suggested by the Dublin Core Metadata Element set (known in the art which establishes the elements subject, title, author, publisher, other agent, date, object type, format, identifier, relation, source, language, description, rights, and coverage). The present invention may also use tags and values relevant to one or more "technology groups". For example, in the situation that a user's task involves designing a desktop architecture, those tags may include overview, desktop, midrange, security, file/print servers, network, and may also use tags relevant to an appropriate "technology subgroup" (e.g. hardware). In other embodiments, other metadata standards known in the art may also be employed, including XML (eXtended Markup Language), RDF (Resource Description Framework), or any other number of known methods.

In accordance with the present invention, a user is offered a means to view a set of tags, and select a subset of tags (with appropriate values) that are relevant to a given scenario and role. In a preferred embodiment, the scenario is not fully dynamic since the set of tags and values are preestablished (by design and not limitation). This is discussed further herein in association with FIGS. 6a–6d. The present invention offers considerably more freedom to navigate a document catalog than by the navigational models currently available. While tagged documents in repository 20 will support pre-defined scenarios, users are also able to create customized scenarios, built out of existing scenario subgoals or by specifying tags and values, and receive a presentation that is as informationally rich as that provided through a pre-defined scenario. Moreover, adding a new document to repository 20 is a matter of specifying the appropriate metadata (tags and values), and adding the document to repository 20.

In addition to contemplated applications by researchers, students, libraries, universities, corporations, etc., the teachings according to the present invention are directly applicable to providing on-line financial services, shopping services, or any other domain where there are (1) distinct user roles, and (2) a set of typical scenarios through which users needing context-dependent information typically navigate.

By better identifying the purpose of the navigational interaction, it can more accurately guide users to the appropriate retrieval strategy. This invention addresses these deficiencies of defining the navigational purpose by giving the administrator of a repository, such as repository 20, the opportunity to define, via metadata, where the information fits within an overall process, in order to improve the likelihood that users will retrieve/access the information (whether they know they need it or not) only when it is directly relevant. Thus by "subscribing" to a process or scenario, the user subscribes to retrieving the relevant information.

A process flow diagram of how the invention is implemented according to the present invention is illustrated in FIG. 2. To begin, user 12 accesses computer 14 (of FIG. 1) and is prompted by system 10 to enter some of the selection criteria relevant to him, such as name, role and scenario, shown as process block 40. In another embodiment, a user's name and various information may be retrieved just from the user logging onto to a network or system with a password unique to the user, etc. or it is also contemplated that the method may enable workflow, as discussed further herein.

In the illustrated embodiment, after the user enters the requested information via keyboard 16, it is received by processor 22 which accesses the user/session storage database 32 to determine whether the user name, role and scenario are known to system 10, shown as process block 42. If they are not known, shown as process block 44, the user selects various tags and enters corresponding values to the user's present task (role, scenario) and any additional search keywords. If the information from process block 42 is known to system 10, the user is prompted to enter any additional keyword or process stage information which may be relevant to this search, shown as 46. In this case, the user would only need to make any necessary updates to his information. The processor then parses and/or translates the provided information into tags and values, if necessary, as shown in process block 48. For example, because process block 44 has the user enter the search criteria in terms of tags and values, parsing and translation should not be necessary.

Document repository 20 is then searched, as shown in process block 50. Repository 20 includes a plurality of documents 21 each having metadata 23 (predetermined tags and values) associated therewith. Thus in process block 50, repository 20 is searched in order to compare and find documents that have matching tags and values. These documents are organized for presentation to the user, as shown in process block 52. As discussed further herein in association with FIGS. 5 and 6, the organization of process block 52 may include ranking the documents based on predetermined value criteria associated with certain tags or otherwise. The presentation is presented for display, as in process block 54. Of course the results of this presentation are stored in storage session database 32 for future searches. This concludes the search or another search may be executed.

Figure 3:
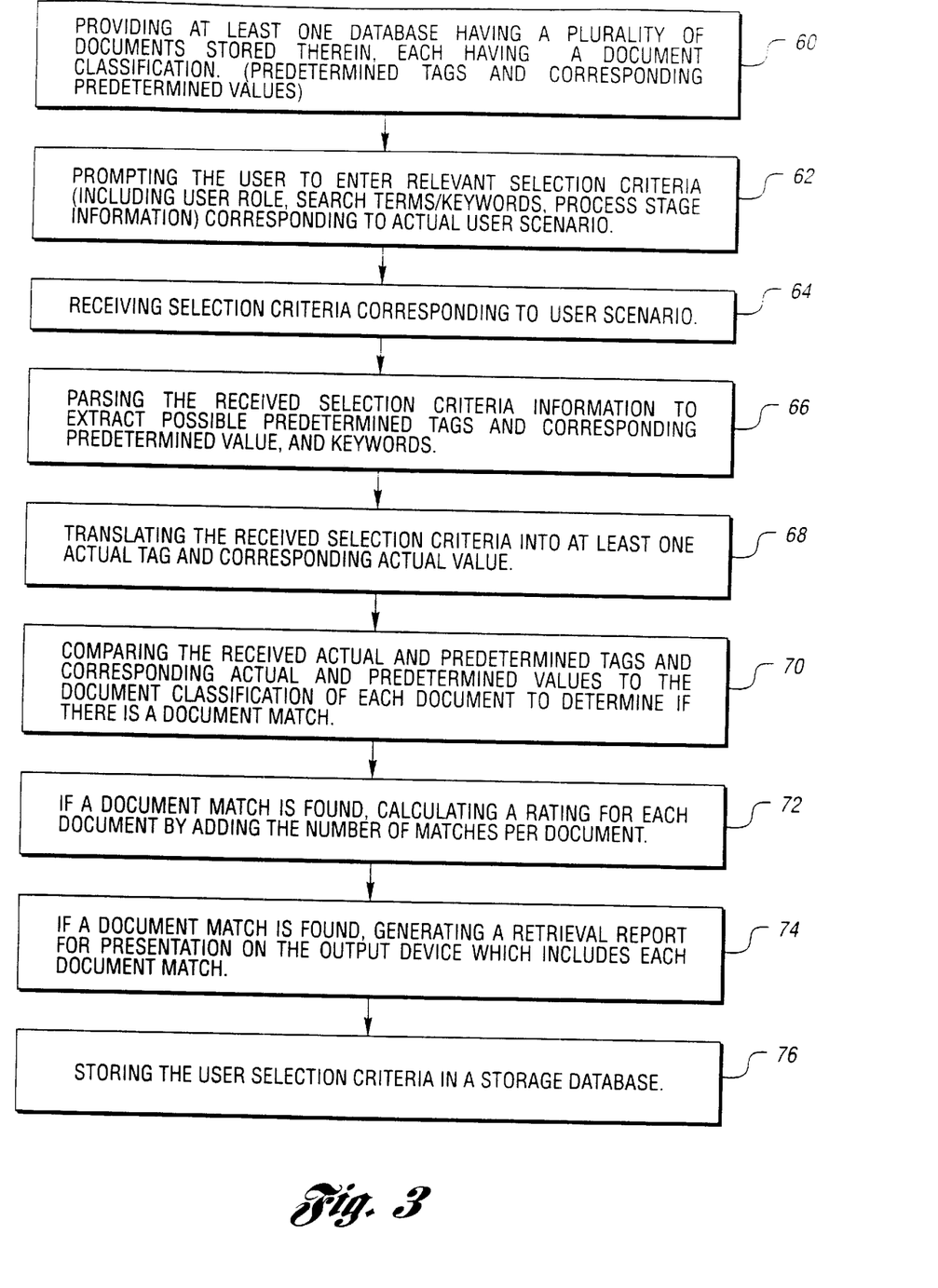
FIG. 3 is a method block diagram of a method for retrieving documents responsive to a given user scenario, according to the present invention.

In keeping with the teachings of the present invention, FIG. 3 illustrates a preferred embodiment of a method according to the present invention. This method of retrieving documents which is responsive to a given user scenario and serves an at least one user who is accessing or has access to an output device, such as display 18 of FIG. 1 or the printer 19 of FIG. 6d. This method includes providing at least one database having a plurality of documents stored therein, where each document has a document classification defined by at least one predetermined tag and corresponding value assigned thereto, as shown in block 60.

In accordance with the first processing step 24 of FIG. 1, the method of FIG. 3 includes receiving selection criteria corresponding to a user scenario, shown in block 64. This may be accomplished by prompting the user to enter the relevant selection criteria, as shown in block 62. In first processor step 24, the user specifies his role and scenario, which includes the task, process and the stage of the process in which the user is engaged. In addition to the role and scenario information, this first step 24 also includes the user providing domain-specific search terms (e.g. keywords) to further constrain the search. This information may be provided in narrative form, phrasing terminology, character strings, or be directly input as values corresponding to selected tags. The invention contemplates that there is a predefined set of user roles and scenarios. With regard to defining scenarios, the system may utilize a set of templates which may be useful in developing and classifying domain-specific scenarios. An example of one such set of templates is KADS (knowledge acquisition and design structures) which is a structured methodology for the development of knowledge based systems. KADS includes process definitions (e.g. planning, design, configuration) along with each template's associated subprocesses (e.g. abstract, classify, specify, etc.).

The invention also contemplates that there is a method provided within which the user may specify a new scenario. It is contemplated by this step that there is a formal process for creating and maintaining scenarios and their associated components. System 10 may also include session management features, as discussed in association with FIG. 2, which involve knowledge of user 12 and what stage of the process in which he is involved in order to develop persistent knowledge about the user across multiple sessions. Such session management is operable in conjunction with user session storage database 32, shown in FIGS. 1 and 2.

Movement through a process or stages of a process may be manual, wherein the user specifies that he has advanced to the next phase, or automatic, wherein the user submits documents to repository 20 that satisfy process stage requirements for the subsequent stages. In accordance with the method's ability to enable workflow as previously discussed, the system is coupled with a workflow solution which takes input from the process and keeps an up-to-date set of relevant documents. In other words, as the user moves from one process step to the next in the scenario, a message or signal is generated by the processor to a user session storage database to update the user information that a process step has been completed, and another message or signal to the repository to update the set of relevant documents that are available to the user for the next process step. This may all be recorded in a user profile in a database, such as database 32.

With continuing reference to FIGS. 1 and 3, the second step of processor 22 is criteria translation 26, wherein the user scenario and domain (keyword) information which is provided in step 1 is parsed (see block 66) and/or translated into a set of tags and values, as shown in block 68. As previously mentioned, it is contemplated that step 2 may be bypassed, and the user may directly specify a set of tags and the associated values. Again, this step contemplates that a fixed set of metadata and (where applicable) values exist from which a sub-set may be selected. For a manual input of tags and values, an appropriate user interface such as keyboard 16 is provided to make manual entry practical. System 10 should incorporate a formal process for creating and maintaining tags and values. To further explain block 66, in the situation that the selection criteria is input in narrative form or character strings, the selection criteria is parsed and possible predetermined tags and corresponding values are extracted.

Further, as shown in block 70, the method includes comparing the received selection criteria to the document metadata assigned to each document to determine if there is a document match. This corresponds to the third step 28 of processor 22 set forth above in FIG. 1. This third step 28 of searching involves the set of tags and values generated in the previous step (either directly from the user or through parsing and/or translation as discussed above) being matched against the document metadata or the tags assigned to documents in repository 20 being searched and their corresponding values. Of course, it is contemplated that documents have been tagged using an accepted set of metadata and values. In the alternative, tags and values can be extracted from the documents dynamically. It is also contemplated that given a mix of documents in the repository having sets of author-assigned tags, repository administrator-assigned tags, and automatically-assigned tags, users are able to use any or all sets, based on user preferences. In a preferred embodiment, in order to assign tags and values to documents in repository 20, there exists either a formal process to assist authors in assigning tags and values to their documents; or there is a utility to automatically assign tags and values; or, a utility exists which is capable of automatically assigning tags and values which can operate across an entire document repository 20 in real time (i.e. while user 12 awaits a response).

If a document match is found, the fourth step 30 of processor 22 of FIG. 1 is triggered. Block 74 shows that the method includes generating a retrieval report for presentation on the output device, wherein the retrieval report includes each document match. In the fourth step 30 of results presentation organization, once a set of documents has been retrieved, the system dynamically assembles a presentation that organizes the documentation based on the user scenario. In another embodiment (and as discussed further herein in association with FIGS. 6a–d) the calculated relevance of each document to the scenario is used to rank the documents. It is contemplated that all scenarios are related to formally established processes. Thus, in a preferred embodiment, each process must be analyzed to derive the subgoals to be accomplished at each step and each sub-goal must be analyzed to derive the appropriate set of tags and values. Preferably, as discussed above, the user selection criteria is stored in a user database (such as database 32 of FIG. 1) for future reference, as shown in block 76.

As will be discussed further herein in association with an example of operation of the system according to the present invention, such formally established processes generally include information of a homogenous class defined by a common set of metadata. Thus repository 20' of FIG. 6b preferably is a database of documents of common tags and assigned values. Such a database, for example, may be a government database containing information and documents related solely to payment of income tax, including forms and instructions, the tax laws, tax court opinions, agency statements and guidelines, and papers and treatises interpreting the same, as discussed further herein in association with the example illustrated in FIGS. 6a–6d.

Figure 4:
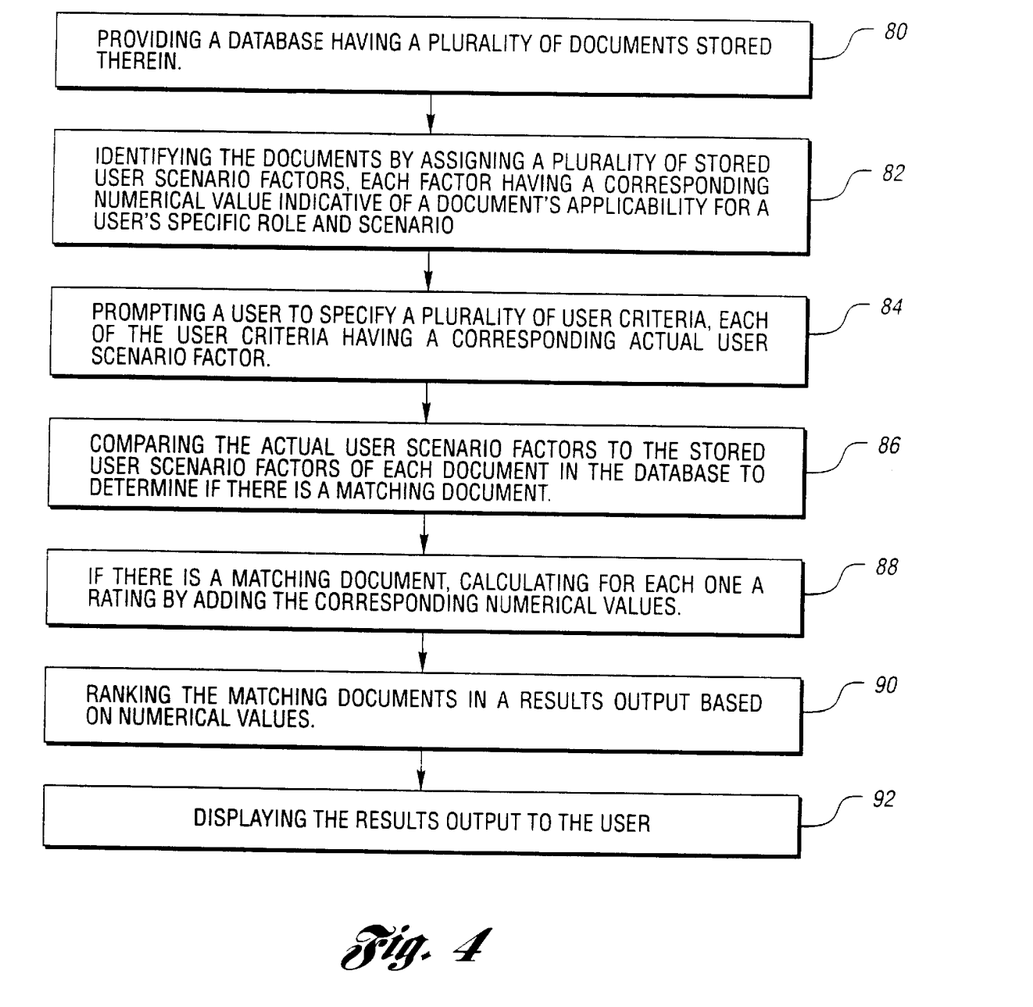
FIG. 4 is another embodiment of a method block diagram for storing and selectively retrieving data from a plurality of documents, according to the present invention.

Referring now to FIG. 4, a still further embodiment of the method according to the present invention is a method for storing and selectively retrieving data from a plurality of documents. Each document has a plurality of predetermined metadata and keywords corresponding thereto. This method includes, as shown in block 80, providing a database having a plurality of documents stored therein, the documents having data and information associated therewith. Further, as shown in block 82, document data is identified by a plurality of user scenario factors, wherein each factor has a corresponding numerical value which is indicative of a document's applicability for a user's specific role and scenario. (Each factor may be in the form of a tag or associated field.) This method also includes the step of prompting a user to specify a plurality of user-specified criteria, each of the user-specified criteria having corresponding user scenario factors, as in block 84. Block 86 includes comparing the actual user-specified scenario factors to the stored document classification for documents in repository 20 to determine if there are any matching documents. As set forth in block 88, this method includes calculating a rating for each document by combining the document classification factors corresponding to user-specified criteria. In one embodiment, the rating is calculated by adding the number of tags matched per document. It is contemplated that the results may be ranked according to the numerical values calculated for each matched document, as in block 90. Also included is displaying the output to the user, as shown in block 92.

Figure 5:
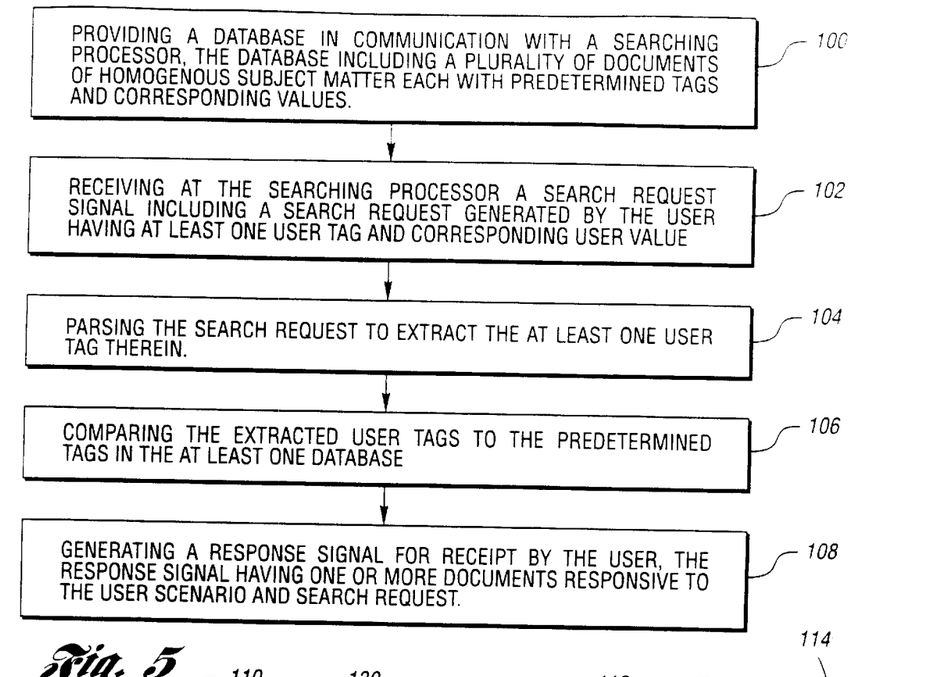
FIG. 5 is another embodiment of a method block diagram for identifying and transmitting documents responsive to a user's scenario, according to the present invention.
Figure 6A:
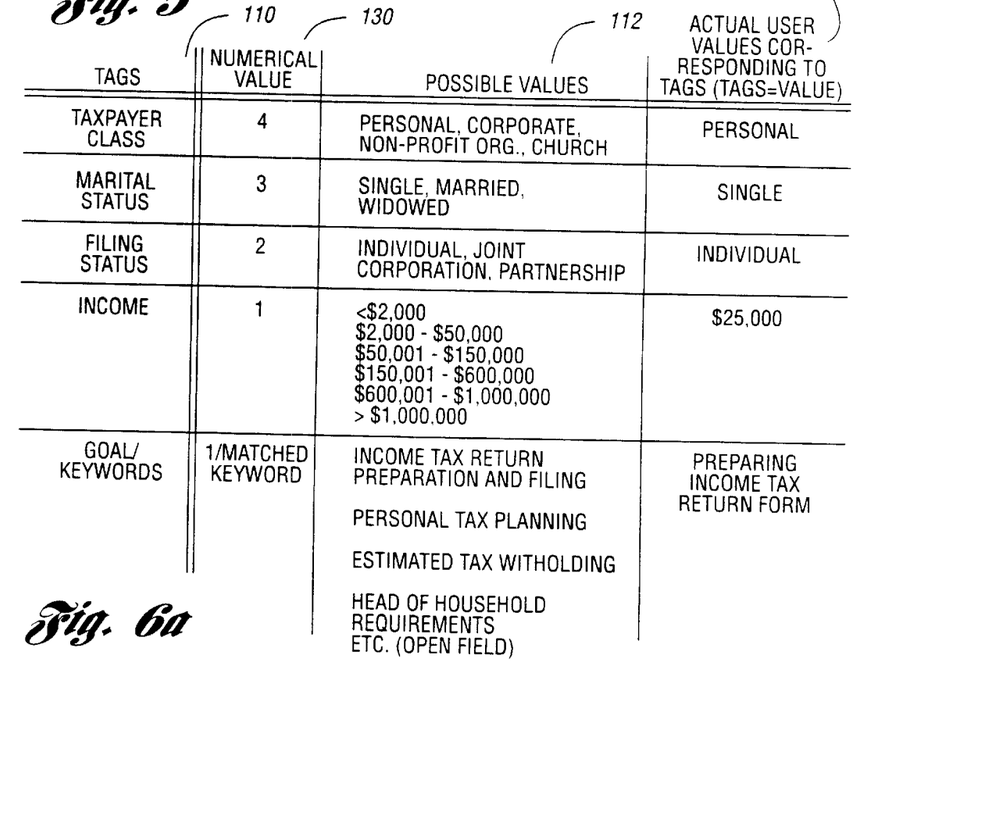
FIG. 6a is a chart representing tags and corresponding possible, actual and numerical values for an example according to the present invention.
Figure 6B:
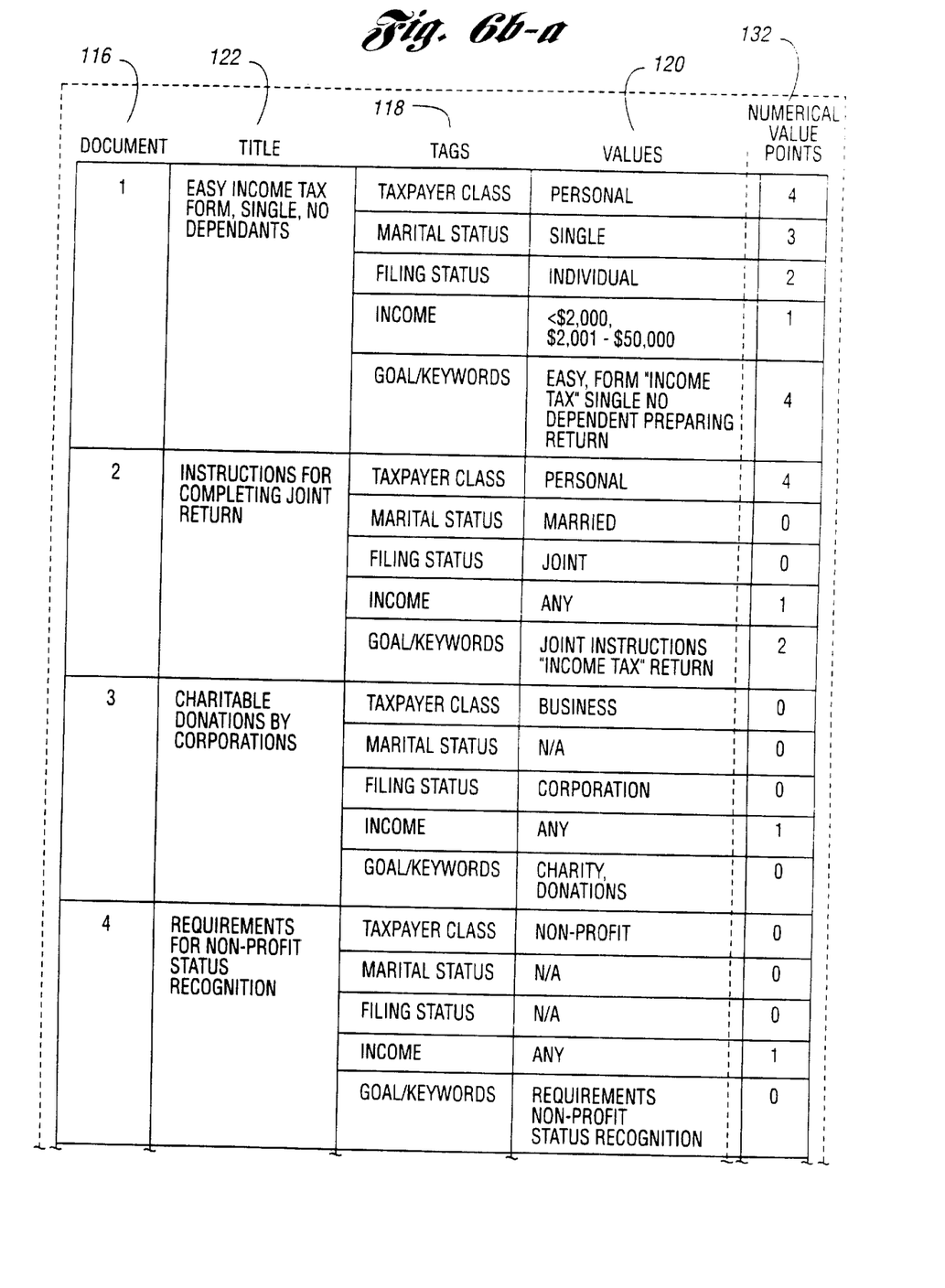

Still another method according to the teachings of the present invention is disclosed herein in association with FIG. 5, being a method for use in a computer system having a processor serving at least one display device, this method of identifying and transmitting documents responsive to a user's scenario. Referring to block 100, this method includes providing at least one database in communication with the searching processor. The at least one database preferably has a plurality of documents which are homogenous in terms of having a standard set of metadata, wherein each document has a common set of predetermined tags. As in block 102, the method further includes receiving at the searching processor a search request signal including a search request generated by the user having at least one user tag and corresponding user value. Shown at block 104 is the step of parsing the search request to extract that at least one user tag therein and comparing the extracted user tags to the predetermined tags in the at least one database, as shown in block 106. The method includes generating a response signal for receipt by the user, the response signal having one or more documents responsive to the user scenario and search request, as shown in block 108.

Referring now to FIGS. 6a–6d, provided therein is an illustrated example of how the method and system according to the teachings of the present invention operates in a utilitarian, real-world scenario. Particularly, this example is highlighted by the aforementioned hypothetical government revenue and tax agency which may exist at any governmental level (federal, state, or city). According to this example, this agency provides to the public comprehensive documentation and support via an informational database which is available to income tax payers at all levels. The user is an individual citizen who desires to search this agency's database. The database has documents and information with respect to the subject area which includes, among other things, all current tax laws, all current tax forms with instructions, opinions by tax courts and other tribunals interpreting the relevant tax laws, advisory opinions by the relevant administrative agency responsible for overseeing tax program, agency regulations, treatises and other articles and publications advising on any aspect related to the subject matter of the database, and other related documentation.

Generally following the flow provided in FIG. 2, the taxpayer is able to perform a search useful to him at the stage in which he is operating (i.e. according to his scenario). As previously illustrated in FIG. 2, the user is prompted to enter his name or other identification (such as a taxpayer number or social security number). Referring to FIG. 6a, the taxpayer user scenario set of tags offered in column 110 are taxpayer class, marital status, filing status, income, and goals. As is further shown in FIG. 6a, possible values corresponding to each of the set of tags of column 110 are shown in column 112 and include taxpayer class values of personal, corporate, non-profit, and church; possible marital status values include single, married, widowed; possible filing status value includes individual, joint, corporation, partnership; and possible income level values include: less than $2000, $2000–$50,000, $50,001–$150,000, $150,001–$600,000, and $600,001–$1,000,000, and greater than $1,000,000. It is from the set of tags and the set of possible values for each tag that the user may select the selection criteria. The possible values listed for the goals/keyword field are only suggestions for the user and are not limitations or restrictions of the field. The use of "possible" suggests that each of the above values is associated with at least one of the documents in the repository, and particularly in association with its corresponding tag. Keywords may include such defining tax terminology as form, charity, dependent, joint, and other words which, for this example, include the main words used in the titles of each of the seven documents shown in FIG. 6b, as well as other words if desired.

In the first process step 24 of processor 22 (of FIG. 1), the user identifies himself and defines his role and scenario in terms of values for each of the set of tags (e.g. personal taxpayer, individual status, single, income of $25,000 per annum), and enters his goal in a narrative statement. This is illustrated in column 114 of FIG. 6a. This user interaction is performed via keyboard 16 of computer 14 (as shown in FIG. 1). Of course, the narrative statement may be guided by exemplary or predefined scenarios provided to the user, as shown in the goals field of column 112 (e.g. personal tax planning, annual income tax return preparation and filing, estimating tax withholding, etc.). Based on the sophistication of the system, the user role and scenario may be loaded in automatically, based on previous interactions. In such situations, the user would only need to make any necessary updates to his information. As previously discussed, for a repeat or user regular, the scenario workflow may be enabled by storing each session in a database, such as database 32 of FIG. 1, so that it may be accessed by the processor upon subsequent use in order to update the user information and also have the repository update the set of relevant documents.

In the second step 26 of processor 22 (with continued reference to FIG. 1) the information shown in column 114 of FIG. 6a, which was gathered in the first step 24 is translated into a set of tags and associated values (e.g. in this example, the form of TAGS=values). Thus the tags/values for FIG. 6a include TAXPAYER_CLASS=personal, MARITAL_STATUS=single, FILING_STATUS=individual, INCOME=25000, GOAL=preparing_income_tax_return_form. As previously stated, the process may start with this step if the user is prompted in terms of choosing tags and is asked to respond with corresponding values, as is the case in this taxpayer example.

With reference to FIG. 6b, for this example, document repository 20' and its contents are illustrated therein. It is shown that repository 20' has a plurality of documents stored therein, and particularly having seven documents fully discussed and illustrated, as designated by document numbers shown in column 116. Each document 1–7 is catalogued by metadata which include tags (as shown in column 118) corresponding to the provided user scenario tags of column 110 in FIG. 6a. In other words, each document 1–7 in database 20' includes tags of taxpayer class, marital status, filing status, income, and title/keywords (the latter corresponding to the user's goals/keywords of FIG. 6a.) As shown in column 120 of FIG. 6b, each predetermined tag of column 118 has at least one corresponding predetermined or assigned value. For reference purposes, each document's title is shown in column 122, from which most keywords in column 120 are borrowed.

In the third step, system 10 must search the anticipated thousands of pages of laws, forms, and documentation maintained in database 20' by the subject revenue agency. Particularly, processor 22 (of FIG. 1) must compare the tags and values specified by the user with the predetermined metadata tags and values in the database (i.e. homogenous metadata). The use of the aforementioned tags ensures that vast portions of this database are ignored. For example, since the taxpayer class is personal, material and information in database 20' relative to corporate income tax, requirements for recognition of non-profit organizations or churches, etc. will be ignored by the processor 22. Thus the focus remains on areas of specific interest (e.g. payment of personal income tax.) During this comparing/matching function of the processor 22, use of the aforementioned tags ensures that vast portions of this database are ignored. For example, in one embodiment, documents 3, 4 and 5 would be automatically excluded solely on the basis of their specific taxpayer class tag having a value other than the value "personal" specified by the user in the user-specified scenario. As shown in FIGS. 6b and 6d, those documents meeting user-specified tags would be 1, 6 and 7. And those documents meeting user-specified tags and keywords would be 1 and 7.

In the fourth step 30 of processor 22' (with further reference to FIG. 1), the information is organized and presented to the user as illustrated in FIG. 6d. See column 124. Note that while presentation methods may vary, the user is likely presented with just those documents above phantom line 125. As shown in column 126, the user may be provided with links 127 for the purpose of linking to the relevant document or relevant portion of the document that pertains to the user-specified role/scenario. The presentation may also resemble the step-by-step process described at the beginning of a typical government tax form document known to most taxpayers, with each step providing links to the specific documentation and forms relevant to the user (and excluding material that is irrelevant). It is contemplated that a user could interactively fill out each form, with the presentation engine controlling the syntactic validation and routing to the user.

Referring still to FIGS. 6a–d, another embodiment according to the present invention corresponds to the method flow block diagram of FIG. 4 and involves a ranking of information retrieved during a search. FIG. 6a further includes a column 130 which associates a numerical value to each tag in column 110. Note that, by way of example only, the taxpayer class tag has been assigned a numerical value of 4, the marital status tag has a numerical value of 3, the filing status tag has a numerical value of 2, the income tag has a numerical status of 1, and the goal tag has a numerical value of 1 per matched keyword. These numerical values are used for purposes of directly ranking or indirectly calculating ranking of documents found in a search based on a document achieving a certain "score," having a certain total numerical value, or having a numerical value above or below a specific range. As shown in FIG. 6b, during processing (comparing/searching step three 28 of processor 22) points are assigned to each tag that have matching corresponding user-specified and document values. For example, in FIG. 6b documents 1 and 7 each have values (column 120) that match the actual user-specified values of column 114 of FIG. 6a. Thus, as noted in column 132 of FIG. 6b, documents 1 and 7 have the total points available for the four tags in conjunction with the search exemplified herein. With regard to the keyword search, each document 1 and 7 has four predetermined keywords that match the user's goal of column 114 those words being: "preparing," "income tax," "return," and "form." Thus four total points are assigned for that field. Of course, the document metadata need not completely match each user-specified tag/value. It should have some intersection for some dynamic linking to occur, and the strength of that linking would be a function of the extent of the intersection (i.e. the size of overlap).

Figure 6C:
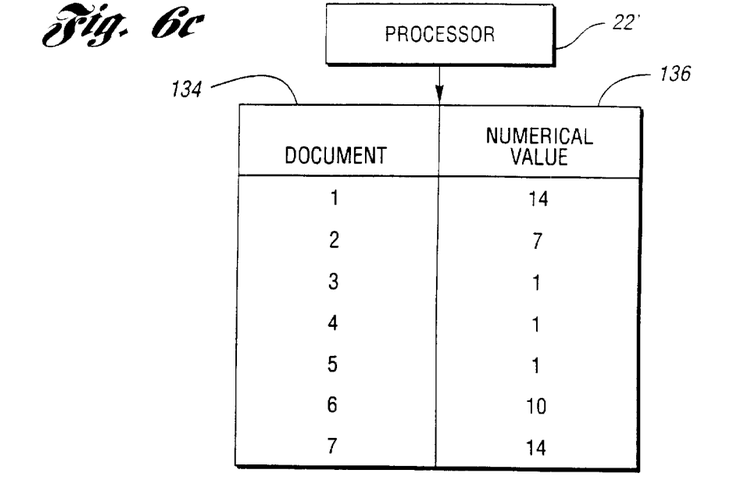
Figure 6D:
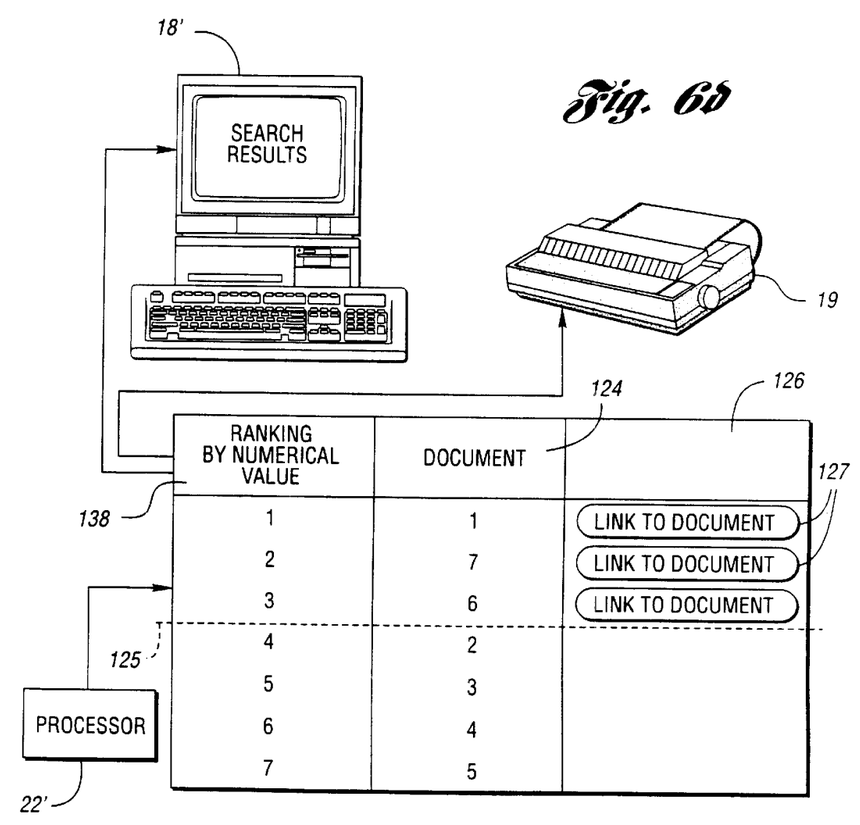
FIG. 6d is a presentation results output according to the embodiments discussed in association with FIGS. 6a and 6c.

Thus, FIG. 6c shows that for each document (column 134), processor 22" adds the numerical value points achieved by each document (from column 132 of FIG. 6b) and calculates a total numerical value for each document (column 136). In this embodiment, FIG. 6d illustrates that the documents are presented to the output device(s) (display 18' or printer 19) in the ranked order of their total numerical value according to column 138. While the ranking is shown in terms of highest numerical value to lowest numerical value, it is of course contemplated that any method of scoring and ranking may be accomplished in order to present the results to the user in a manner according to the present invention. Again, under the goals and teachings of the present invention, only those documents related to the user's criteria specification entered by the user (role and scenario) are presented to the user (above line 125 in FIG. 6d).

A more advanced example may have a scenario as follows:

SCENARIO: "File individual income tax: {the goal}
ROLE: citizen, tax_preparer {who might be interested in using this}
PROCESS_STEPS:
  STEP: "Obtain forms"
    END_WHEN: ALL_FORMS_RETRIEVED= YES
  STEP: "Fill out forms"
    END_WHEN:ALL_FORMS_COMPLETE=YES AND ALL_FORMS_DOUBLECHECKED= YES
  STEP: "Electronic filing"
    ROLE: tax_preparer {only professionals have this option}
    END_WHEN: FORMS_RECEIVED=YES
  STEP: "File return"
    END_WHEN:FORMS_MAILED=YES
END_PROCESS This tax preparation scenario illustrates the potential utility of a relatively more efficient and effective retrieval mechanism (in, terms of expressiveness and flexibility) for information that is able to leverage usage-specific knowledge. The scenario-based navigation augments the traditional information navigational technologies. By separating the information residing within the repository from the access methods, a scenario-based navigation system can support changes to either component (document metadata and user selection criteria) without demanding changes to the other.

The teachings according to the present invention overcomes limitations of a user accessing information through only those factors which are predicted and predefined by an author. While tagged documents will support predefined scenarios, users are also able to create customized scenarios (built out of existing scenario sub-goals, or by specifying tags and values) and receive a presentation that is just as informationally rich and responsive to a request as that provided through a predefined scenario.

According to the teachings of the present invention, it is less costly to maintain a document repository or database such as that disclosed herein. If a repository can be managed dynamically, adding a new document becomes a matter of specifying the appropriate metadata in terms of tags and values, and adding the document to the repository. Thus, the need to statically link a document into one or more predefined presentation scenarios and maintain those links over time, is eliminated.

Thus, the system according to the present invention may be viewed as a layered system, as suggested by FIG. 2. The layers include:
  at least one document in a repository
  metadata describing each document
  complete set of metadata (all possible tags with corresponding values in repository)
  user-specified scenario metadata
  navigation/retrieval of documents in the repository It is understood, of course, that while the forms of the invention herein shown and described include the best mode contemplated for carrying out the present invention, they are not intended to illustrate all possible forms thereof. It will also be understood that the words used are descriptive rather than limiting, and that various changes may be made without departing from the spirit or scope of the invention as claimed below.

What is claimed is:

1. A method of retrieving documents responsive to a given user scenario and serving at least one user accessing an output device, comprising:

providing at least one database having a plurality of documents stored therein, each of the plurality of documents having metadata manually assigned thereto, the metadata defined by at least one predetermined tag and corresponding value assigned thereto;

receiving selection criteria from a user corresponding to the user's role and scenario;

comparing the received selection criteria to the metadata assigned to each document to determine if there is a document match; and if a document match is found, generating a retrieval report including each document match for presentation on the output device.

2. The method of claim 1 further comprising prompting the user to enter the selection criteria.

3. The method of claim 1 wherein receiving the scenario criteria includes receiving a user tag and corresponding user value assigned thereto based on the actual user scenario.

4. The method of claim 1 wherein receiving selection criteria from the user includes:

receiving a searchable phrase corresponding to the actual user scenario; and parsing the searchable phrase and extracting keywords corresponding to at least one user tag and corresponding user value.

5. The method of claim 1 wherein receiving selection criteria from the user includes:

receiving a searchable phrase corresponding to the actual user scenario; and translating the searchable phrase into a set of user tags and corresponding user values.

6. The method of claim 1 wherein receiving selection criteria from the user further includes receiving an at least one user tag and corresponding user value associated with a process and a stage of the process in which the user is operating.

7. The method of claim 1 wherein receiving selection criteria by the user further includes receiving search terms to constrain the search.

8. The method of claim 1 wherein receiving selection criteria by the user includes the user specifying a set of user tags and corresponding user values.

9. The method of claim 1 wherein generating the presentation includes ranking the documents displayed in the presentation based on the calculated relevance of each document retrieved.

10. The method of claim 1 wherein receiving selection criteria corresponding to the user includes selection criteria entered by the user via an input device.

11. The method of claim 1 further comprising:

storing the user selection criteria in a storage database.

12. The method of claim 11 further comprising:

searching the storage database for stored user selection criteria; and retrieving the stored selection criteria from the storage database.

13. The method of claim 1, further comprising parsing the search request to extract at least one of an actual tag and an actual corresponding value that may be present therein.

14. A method of retrieving information for serving at least one user accessing an output device, the method comprising:

providing at least one database for storing a homogenous set of documents each having a plurality of predetermined tags and associated values representing a possible user scenario;

receiving selection criteria entered by the user, including actual user scenario and role;

translating the selection criteria into a set of actual user tags and corresponding actual values;

comparing the user tags and values with the predetermined tags and values associated with each document in the at least one database to determine if there is a match; and if there is a match, generating a retrieval report for presentation to the output device representing each matched document.

15. The method of claim 14, wherein translating the selection criteria includes parsing the selection criteria to extract actual values that may be present therein;

searching a second database having stored therein a table for matching an actual value to a corresponding actual tag.

16. A method for storing and selectively retrieving documents comprising:

providing a plurality of homogenous documents in a storage device;

identifying the documents by assigning a plurality of predetermined tags and corresponding predetermined values in the database associated to predetermined user scenarios;

prompting the user to enter specific user criteria in the form of user values corresponding to a plurality of user tags;

comparing the user tags and values to the predetermined tags and values to determine a document match;

if there is at least one document match, calculating a rating for each document by adding the number of tag matches per document; and generating a report to the output device in a manner defined by rating calculation.

17. The method of claim 16 further comprising providing a document to the output device based on selection by the user.

18. A method for storing and selectively retrieving data from a plurality of documents, the method comprising:

assigning manually to said plurality of documents a plurality of data scenario factors, each data scenario factor having a corresponding numerical value indicative of the document's applicability to a user;

storing said plurality of documents in a database; prompting a user to specify a plurality of user criteria, each of the user criteria having a corresponding user scenario factor;

comparing the user scenario factors to the data scenario factors of each document to determine if there is a matched document;

calculating an applicability rating for each matched document by combining the numerical value thereof; and displaying at least one matched document to the user according to applicability rating.

19. For use in a computer system having a processor serving at least one display device, a method of identifying and transmitting documents responsive to a user's scenario, the method comprising:

providing at least one database in communication with the searching processor, the at least one database including a plurality of documents of homogenous subject matter, the plurality of documents having predetermined tags and corresponding values manually assigned thereto;

receiving at the searching processor a search request signal including a search request generated by the user having at least one user tag and corresponding user value;

parsing the search request to extract the at least one user tag therein;

comparing the extracted user tags to the predetermined tags in the at least one database; and generating a response signal for receipt by the user, the response signal having one or more documents responsive to the user scenario and search request.

20. A document retrieval system adaptable for access by at least one user comprising:

a database including a plurality of documents each having manually assigned thereto a set of predetermined tags corresponding to a user scenario and at least one corresponding predetermined value for each tag which define the parameters by which each document is searchable in the database;

a processor in electrical communication with the database for receiving a plurality of user tags and corresponding user values and for comparing the user tags and corresponding user values with the predetermined tags and corresponding predetermined values to determine a match;

a generator in electrical communication with the processor which generates a results list of documents corresponding to the matched documents; and an output device in electrical communication with the generator for delivering the results list to the user.

21. The system of claim 20 further comprising at least one input device for allowing the user to enter the user scenario.

22. An information retrieval system including a computer having an input device and output device, the system comprising:

at least one database in cooperation with the computer including a plurality of documents of homogenous subject matter each having a plurality of manually assigned predetermined tags and corresponding predetermined values associated therewith defining a documents scenario parameters;

a processor in communication with the input device and in electrical communication with the database for receiving a plurality of user tags and corresponding user values and for comparing the user tags and corresponding user values with the predetermined tags and corresponding predetermined values to determine a match; and a generator in electrical communication with the processor which generates a results list of documents corresponding to the matched documents and delivers the results list to the output device.

* * * * *